May 19, 1964 K. BODENRÖDER 3,133,736

RECORD CHANGERS FOR AUTOMATIC UNINTERRUPTED PLAYING OF UPPER AND LOWER SIDE OF RECORD LOADING

Filed June 20, 1961 2 Sheets-Sheet 1

INVENTOR.
KARL BODENRÖDER

BY
M^cGlew and Toren
ATTORNEYS

May 19, 1964 K. BODENRÖDER 3,133,736

RECORD CHANGERS FOR AUTOMATIC UNINTERRUPTED PLAYING OF UPPER AND LOWER SIDE OF RECORD LOADING

Filed June 20, 1961

2 Sheets-Sheet 2

INVENTOR.
KARL BODENRÖDER

BY

M Glew and Toren

ATTORNEYS 3,133,736

RECORD CHANGERS FOR AUTOMATIC UNINTERRUPTED PLAYING OF UPPER AND LOWER SIDE OF RECORD LOADING

Karl Bodenröder, 31 Reichelstrasse, Frankfurt am Main, Germany

Filed June 20, 1961, Ser. No. 118,430
Claims priority, application Germany July 21, 1960
7 Claims. (Cl. 274—10)

Figure 1:
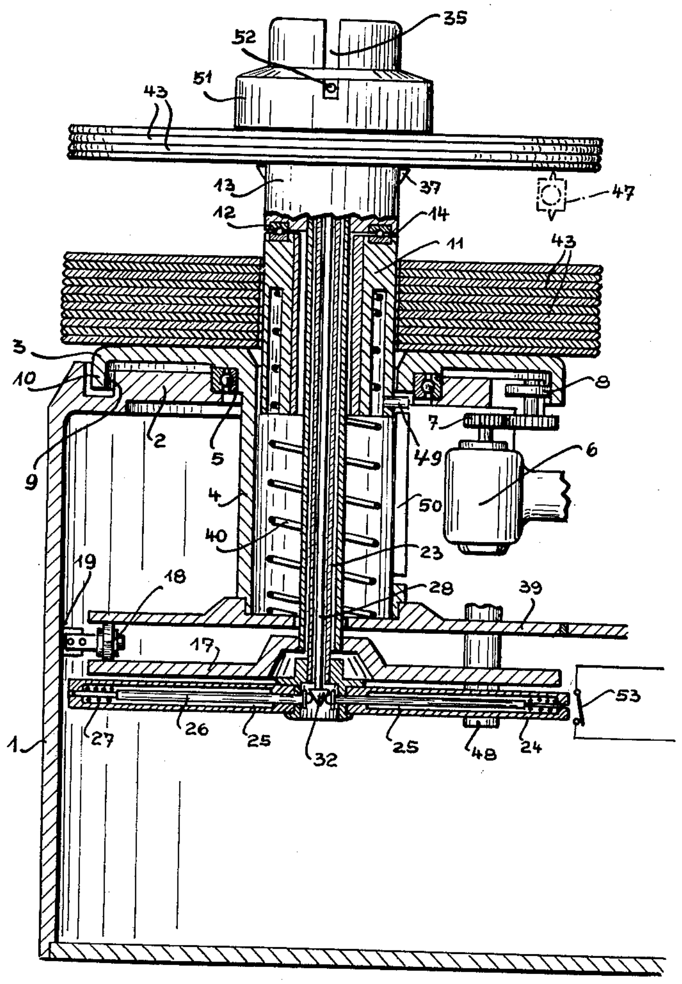

This invention covers a record changer for automatic, uninterrupted playing of upper and lower side of record loading. Record changers of this type are known for their turntable spindle which will be raised above turntable surface and provided with two retractable cams which for the time being support the records at a distance from the turntable.

After playing the lower side of the lowest record of the loading, supported by the cams, these cams are retracted into the turntable spindle by a known mechanism when tone arm is swung out, and simultaneously the second-lowest record is lifted by stop pins from below so that the lowest record of the stack can drop on the turntable, and at the same time the other records, kept in place by stop pins, will rest on the cams with all parts swinging back to their initial position. The tone arm is again moved to the center and will play the upper side of the record on turntable. This process is being repeated after playing of a new record side.

In all known record changers of this type, however, the turntable motor must change the drive direction because of rotation playing of upper and lower record sides, creating thus undesirable intervals for deceleration and starting and prolonged interruptions. The invention covers a new construction type of these record changers with a turntable keeping the same running direction for playing of both upper and lower sides of all records.

For this purpose the invention provides a record changer with raised spindle hub and lateral bolt rests to support record loading at an adequate distance from the turntable—these bolt rests can be retracted in connection with the tone arm to safeguard a piece-by-piece lowering of records on the turntable—which will receive the bolt rests in a headpiece rotating on the spindle hub of the turntable and have it turned in the opposite direction by the drive motor of the turntable.

An advantageous setup has the headpiece with a hollow spindle running in the spindle bore of the turntable hub and both hollow spindle and turntable hub carrying at their lower ends two short-spaced contact disks with an intermediate stationary friction wheel. The hollow spindle of the headpiece contains a second rotating hollow spindle with another disk at its lower end and a brake that is released when tone arm returns to its final play-off position. This latter hollow spindle serves as control mechanism for the retractable rests for lowering of records on the turntable.

Another feature of this invention is the fact that the spindle hub of the turntable is likewise constructed as a hollow hub with an interior spring-set cylinder piece supporting the headpiece. Due to this mechanism it is possible to insert against the spring headpiece and cylinder piece into the hollow hub in order to lift out all records or a single record lowered on the turntable until the stop pins will select the lowest or one of the lowered records. The extension play of the cylinder piece out of the hollow hub is limited to the effect that in the original position all parts keep a definite extension.

It will prove to the purpose to provide the brake disk with one or several retracted radially movable switch rods for a limit stop switch. The rods will have a coordinated control rod, running in the inner hollow spindle, the headpiece carrying a load collar with an intercalated transverse bridge through the diameter slot of the headpiece, and the length of the control rod is measured so as to be shifted by the transverse bridge as soon as the last record is lowered from stop pins on the turntable and will actuate the limit stop switch with the switch rods.

Due to the fact that there is no change in the running direction of the turnable, there are only minor intervals of playing time while the lowest record is lowered to the turntable and furthermore restricts the time for moving back and forth of the tone arm.

The new construction is detailed hereafter with drawings.

FIG. 1—section of total setting

Figure 2:
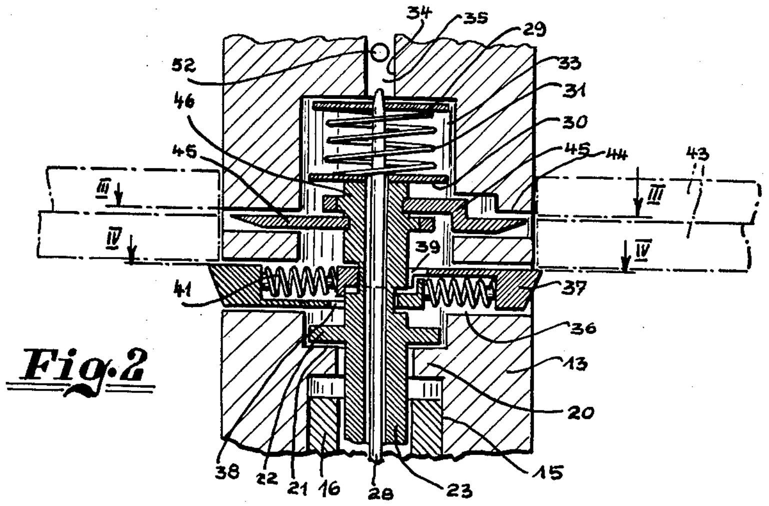

FIG. 2—enlarged section of headpiece

Figure 3:
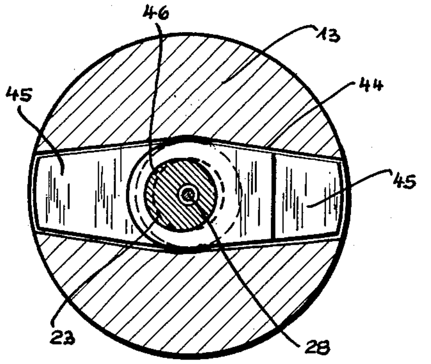
Figure 4:
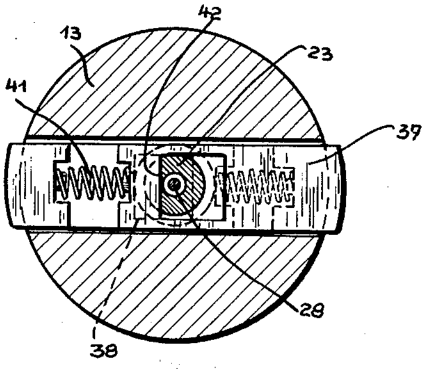

FIGS. 3 and 4—and cross-sections following the lines III—III a/o IV—IV of FIG. 2.

In a casing 1 with cover 2 a turntable 3 with a hollow hub 4, is arranged rotating around a vertical spindle with a roller bearing 5. The turntable drive 3, 4 is guaranteed by an electric motor 6, located in casing 1 via reduction gear 7 and friction wheel 8, contacting the inside surface 9 of a bent-off flange rim 10 of the turntable 3, 4. The hollow hub 4 of turntable 3 bears at its lower end a disk wheel 39, whose diameter corresponds to the turntable 3 diameter.

The hollow hub 4 carries a movable cylinder piece 11 supported on the disk wheel 39 by a buffer spring 40. A bolt 49 of the cylinder piece 11, running in a jacket slot 50 of hub 4, will limit the extension play of the cylinder piece 11. The cylinder piece 11 carries on an intermediate layer of a ball bearing 12 a cylinder head 13 of equal diameter.

A tube 16 is firmly fixed into a spindle boring 15 starting from the lower face 14 of the cylinder head 13, reaching underneath the disk wheel 39 with a disk 17 at its lower end. Both disks 39, 17 have a tappet 18 for driving connection, supported by a bearing arm 19 of the casing 1.

Due to the arrangement of the tappet 18 the turntable drive 3, 4, 39 has disk 17 and tube 16 and the supported cylinder head 13 running in the opposite turntable direction 3, 4, 39.

The cylinder piece 13 carries a rotating disk 22 of a tube 23, supported by a collar 21, resulting from a tapered section 20 of the spindle boring 15, extending longitudinally through tube 16 and with a disk 24 projecting at its lower end. Disk 24 is provided with several radial drillings 25 in which movable control rods 26 are running. The control rods 26 are so dimensioned that in their retracted original position they are kept in place by spring action 27 and do not much project above the rim of their carrier disk 24.

Inside tube 23 runs a movable rod 28 with a disk 29 near its upper end. Between this disk 29 and disk 30 of tube 23 a spring 31 is fastened at the upper rim, retaining rod 28 in the upper original position towards tube 23.

Rod 28 carries at its lower end a cone head 32 at whose outside jacket the control rods 26 are kept by spring action 27.

When the rod 28 is lowered into tube 23 the effect consequently is that the control rods 26 are pushed radially outwards against the spring action 27 so that their free ends project over their carrier disk.

The spindle boring 15 of the cylinder piece 11 is provided with a continuous boring 34, located above the space for disks 29, 30 and spring 31 and shifted opposite, from which start two opposite radial slots 35.

Within space 33 the headpiece 13 is provided with a transverse boring 36. Two movable wedge pieces 37 run in this transverse boring 36. The wedge pieces 37 run movably in axial slot holes 38 in the tube 23 under spring action 41, retaining them in their extended position out of the headpiece 13.

Within the sphere of wedge pieces 37 tube 23 is provided in two opposite places with flattenings 42 to the effect that when tube 23 is twisted towards headpiece 13 the wedges 37 are retracted against spring action 38 into their guiding transverse boring 36.

A second transverse boring 44 is provided about the thickness of records 43 above transverse boring 36. It carries two flat slides 45. The slides 45 run with holes in eccentric disks 46 of the tube 23, and in the original position of tube 23 they are retracted as to headpiece 13. When twisting tube 23 against headpiece 13 they will project.

In order to prepare the phonograph for playing of records 43, an adequate number of records, about 15, will be set in desired sequence on the headpiece 13, while the lowest record is supported by the wedges 37. Disk 24 is provided with a brake 48. When actuating brake 48, the two disks 17 and 24 and their fixed tubes get into a relative twist. During this relative twist the wedge pieces 37 are retracted into the transverse boring 36 and simultaneously slides 45 are extended. This brake 48 is released when tone arm 47 has finished the lowest record above the wedge pieces. This lowest record is thereupon dropped on turntable 3 or on the existing stack, while the second-lowest record on the head-piece 13 is retained by slides 45.

Tone arm 47 is thereupon swung back in the well-known manner to play the upper side of the topping record on turntable 3, and brake 48 is released so parts 13 16, 17 and 23, 24 return to their respective original position, so that slides 45 are retracted and wedge pieces 37 extended and the remaining records of headpiece 13 can glide down until the lowest record will rest on the wedge pieces 37.

Records 43 retained within the sphere of headpiece 13 by wedge pieces 37 will be charged by a collar 51 on the headpiece 13 which will secure drive turning of these records 43 by headpiece 13.

Collar 51 is provided with a transverse rod 52 over the diameter of its bore, running in the radial slots 35 of the headpiece 13. The level of the transverse rod 52 on the collar was chosen with regard to the upper end of rod 28 in its original position inside headpiece 13 that when the last record 43, retained by wedge pieces 37 to the turntable 3, is released the transverse rod 52 will shift the rod 28 down to the effect that the cone 32 will extend radially the rods 26 of the disk 24. The latter will then project over the rim of disk 24. Disk 24 is provided with a breaker 53 which is temporarily interrupted by the projecting end of one of the rods, switching off the circuit of drive motor 6.

The level of headpiece 13 above wedge cams and the level of the projecting part of cylinder piece 11 over turntable 3 are dimensioned as to take the entire stack of records loaded at a time.

The thickness of spring 40 is chosen so that in case of charges by all records 43 kept by wedge pieces 37 on the headpiece 13 the cylinder piece 11 will still project so much over turntable 3 that the lowest record can be transferred from wedge pieces 37 to the turntable 3.

The length of the turntable hollow hub 4 was furthermore chosen in a way as to facilitate a pressing down of the cylinder piece 11 with the headpiece 13, both manually or by a lever, against spring action 40, so far into the hollow hub 4 that the upper parts of wedge pieces 37 are almost level with the upper turntable surface 3. The bore of hollow hub 4 has a cone-shaped extension at its upper end 54 to receive the retracted ends of wedge pieces.

This type of construction facilitates a pressing down of parts 11, 13 whereupon the wedge pieces 37 glide past the record loading 43 on the turntable 3, the wedge pieces are pressed down on underneath the lowest record on turntable 3 so that when the charge is removed, all records 43 together with parts 11, 13 returning to their original poistion are ready for a new playing.

I claim:

1. A record changer comprising a turntable having a central hollow hub portion, a turntable spindle projecting upwardly of said hub portion, cam means carried by said spindle including a laterally movable projecting portion, means urging said projecting portion outwardly from said spindle for supporting records thereabove, independently actuatable means associated with said spindle effective to actuate said cam means to withdraw said projecting portion from a record supporting position and to release a record downwardly onto said table, means supporting said spindle with said cam means for floating vertical movement, said cam means being contoured to be deflected inwardly when said spindle is moved in a direction downwardly toward said turntable to permit said cam means to be moved past said records and below said records, said turntable hub means being sufficiently wide to permit said cam means to move outwardly at a location below said records to pick said stack of records up when said spindle is moved in a direction upwardly from said turntable.

2. A record changer according to claim 1, including a cylindrical piece connected to said upper end of said spindle and a spring supporting said cylindrical piece with said spindle positioned in said turntable hub.

3. A record changer according to claim 1, wherein said hub is of substantially the same internal diameter as the internal diameter of the hole of the record but includes a flaring portion at the upper end thereof adjacent the turntable to permit outward movement of said cam means when it is positioned directly below the records on said turntable.

4. A record changer according to claim 1, including an elongated sleeve surrounding said spindle, said independently actuated means associated with said spindle including means to rotate said sleeve, said laterally projecting portion of said cam means being displaceable laterally upon rotation of said sleeve member.

5. A record changer comprising a turntable including a hub portion elongated in a vertical direction extending downwardly from the top of said turntable, a spindle supported below said turntable and extending upwardly above said turntable in said central hub portion, a cylindrical piece carried by said spindle at the upper end thereof, resilient means supporting said cylindrical piece for floating vertical movement into and out of said central hub portion and normally sustaining said cylindrical piece with said spindle at a location spaced above the top of said turntable, cam means carried by said spindle including a laterally movable projecting portion, means urging said projecting portion outwardly for supporting records thereabove, said projecting portion having an upwardly and outwardly bevelled deflecting face permitting downward movement thereof and inward deflection against said urging means when said cylindrical piece is moved downwardly beyond a record, means connected to said cam means and effective to withdraw said projecting portion from a record supporting position and to release the record downwardly onto said turntable, said cylindrical piece being movable downwardly into said central hub by compressing said resilient means, whereby the projecting portion of said cam means is deflected inwardly beyond any records positioned on said turntable, said central hub being wide enough below said record to permit outward movement of said projecting means to the record supporting position, to permit picking up of a stack of records positioned on said turntable when said cylindrical piece is released to move upwardly under the urging of said biasing means.

6. A record changer with a turntable spindle projecting from the turntable, provided with lateral cams to support a recording loading at a suitable distance from the turntable, said cams being carried by said turntable and being retractable for a piece-to-piece lowering of records on the turntable in connection with the tone arm, characterized by the fact that wedge pieces are received by a rotating headpiece on the spindle hub of the turntable and which is driven in the opposite rotation by the turntable motor, and that the hollow spindle of the turntable will receive a movable cylinder piece retained by spring action on the upper face of which the headpiece with an intermediate ball bearing is kept in place, while the extension play of the cylinder piece is limited by a stop guide, the insertion being so dimensioned that the headpiece can be pressed down to enable the wedge pieces to get underneath the lowest disk on the turntable.

7. A record changer according to claim 6, wherein a removable circular disk with a transverse bridge will be run on the headpiece, the transverse bridge having a coordinated diameter slot in the headpiece, the length of the switch rod and level of said transverse bridge in said circular disk with regard to its lower side being chosen so that with release of the latest record by the wedge pieces to the turntable the transverse bridge will shift the switch rod down to release the limit stop switch.

References Cited in the file of this patent

UNITED STATES PATENTS

| | | |
|---|---|---|
| 2,628,843 | Comstock | Feb. 17, 1953 |
| 2,643,127 | Gregg et al. | June 23, 1953 |
| 2,949,310 | Mueller | Aug. 16, 1960 |
| 2,960,340 | Seidel et al. | Nov. 15, 1960 |